(12) United States Patent
Watson et al.

(10) Patent No.: US 9,652,615 B1
(45) Date of Patent: May 16, 2017

(54) SYSTEMS AND METHODS FOR ANALYZING SUSPECTED MALWARE

(71) Applicant: Symantec Corporation, Mountain View, CA (US)

(72) Inventors: Andrew Collingwood Watson, Gloucestershire (GB); Abubakar A. Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/314,033

(22) Filed: Jun. 25, 2014

(51) Int. Cl.
*G06F 11/00* (2006.01)
*G06F 21/56* (2013.01)
*G06F 21/52* (2013.01)
*H04L 29/06* (2006.01)

(52) U.S. Cl.
CPC ........ *G06F 21/562* (2013.01); *H04L 63/1416* (2013.01); *G06F 21/52* (2013.01); *H04L 63/1408* (2013.01)

(58) Field of Classification Search
CPC . H04L 63/14; H04L 63/1416; H04L 63/1408; H04L 63/1441; H04L 63/145; G06F 21/52; G06F 21/55; G06F 21/56
See application file for complete search history.

(56) References Cited

U.S. PATENT DOCUMENTS

| | | | |
|---|---|---|---|
| 5,956,729 A | 9/1999 | Goetz et al. | |
| 7,840,663 B1 * | 11/2010 | Hinchliffe | H04L 63/1408 709/224 |
| 8,365,283 B1 | 1/2013 | Satish et al. | |
| 8,621,625 B1 | 12/2013 | Bogorad et al. | |
| 8,806,644 B1 | 8/2014 | McCorkendale et al. | |
| 9,152,694 B1 | 10/2015 | Padidar et al. | |
| 9,571,509 B1 | 2/2017 | Satish et al. | |
| 2007/0079379 A1 | 4/2007 | Sprosts et al. | |
| 2007/0136292 A1 | 6/2007 | Ohara | |

(Continued)

OTHER PUBLICATIONS

Sourabh Satish, et al; Systems and Methods for Analyzing Malware Samples and Assigning File Reputations; U.S. Appl. No. 61/989,790, filed May 7, 2014.

(Continued)

*Primary Examiner* — Ali Abyaneh
*Assistant Examiner* — Shaqueal Wade
(74) *Attorney, Agent, or Firm* — FisherBroyles LLP

(57) ABSTRACT

The disclosed computer-implemented method for analyzing suspected malware may include (1) identifying a file suspected of including malware, (2) performing a static analysis of the file to identify at least one indication of an attack vector that the file uses to attack computing systems, (3) obtaining, from at least one computing system, telemetry data that identifies at least one indication of an attack vector that the file uses to attack computing systems, (4) constructing, using the indications obtained from the static analysis and the telemetry data, an execution profile that describes an execution environment that provides the attack vectors indicated by the static analysis and the telemetry data, and (5) configuring the execution environment described in the execution profile to test the file for maliciousness. Various other methods, systems, and computer-readable media are also disclosed.

20 Claims, 6 Drawing Sheets

(56) References Cited

U.S. PATENT DOCUMENTS

| | | | |
|---|---|---|---|
| 2007/0256127 A1* | 11/2007 | Kraemer | G06F 21/552 726/23 |
| 2008/0228814 A1 | 9/2008 | Raley et al. | |
| 2009/0044024 A1* | 2/2009 | Oberheide | G06F 21/562 713/188 |
| 2009/0075592 A1 | 3/2009 | Nystrom et al. | |
| 2011/0219449 A1 | 9/2011 | St. Neitzel et al. | |
| 2012/0159260 A1 | 6/2012 | Fortune et al. | |
| 2012/0210428 A1 | 8/2012 | Blackwell | |
| 2012/0240236 A1 | 9/2012 | Wyatt et al. | |
| 2012/0266157 A1 | 10/2012 | Mun et al. | |
| 2012/0317609 A1 | 12/2012 | Carrara et al. | |
| 2013/0117848 A1* | 5/2013 | Golshan | G06F 21/00 726/23 |
| 2015/0220734 A1 | 8/2015 | Nalluri et al. | |
| 2015/0261653 A1 | 9/2015 | Lachambre et al. | |

OTHER PUBLICATIONS

Sourabh Satish; Systems and Methods for Identifying Malicious Files; U.S. Appl. No. 14/301,985, filed Jun. 11, 2014.

Sourabh Satish; Systems and Methods for Analyzing Malware Samples; U.S. Appl. No. 14/314,031, filed Jun. 25, 2014.

Sourabh Satish; Systems and Methods for Detecting Misplaced Applications Using Functional Categories; U.S. Appl. No. 14/315,312, filed Jun. 25, 2014.

Sourabh Satish, et al; Systems and Methods for Identifying Variants of Samples Based on Similarity Analysis; U.S. Appl. No. 14/315,321, filed Jun. 25, 2014.

"Application software", http://en.wikipedia.org/wiki/Application_software, as accessed Apr. 24, 2014, Wikipedia, (May 8, 2004).

"Advanced Threat Report 2013", FireEye, Inc., https://www2.fireeye.com/ppc-advanced-threat-report-2013-uk.html, as accessed Apr. 24, 2014, (2013).

"Palo Alto Networks", https://www.paloaltonetworks.com/, as accessed Apr. 24, 2014, (Oct. 18, 2000).

"FireEye, Inc.", http://www.fireeye.com/, as accessed May 6, 2014, (Oct. 12, 1999).

Dark Reading, "Automated Malware Analysis Under Attack", http://www.darkreading.com/vulnerabilities---threats/automated-malware-analysis-under-attack/d/d-id/1138904?, as accessed May 14, 2014, (Dec. 20, 2012).

Zeltser, Lenny "5 Steps to Building a Malware Analysis Toolkit Using Free Tools", http://zeltser.com/malware-analysis-toolkit/, as accessed May 14, 2014, (1995).

Shinotsuka, Hiroshi "Malware Authors Using New Techniques to Evade Automated Threat Analysis Systems", http://www.symantec.com/connect/blogs/malware-authors-using-new-techniques-evade-automated-threat-analysis-systems,as accessed May 14, 2014, Security Response Blog, Symantec, (Oct. 26, 2012).

"Cuckoo Sandbox", http://www.cuckoosandbox.org/, as accessed May 14, 2014, (2010).

L33T, "Setup Automated Malware Analysis—Cuckoo Sandbox on Bt-3", http://www.securitytube.net/video/6653, as accessed May 14, 2014, (Jan. 14, 2013).

"Blue Coat", https://www.bluecoat.com/, as accessed May 14, 2014, (Mar. 24, 2002).

Sourabh Satish; Identifying Misuse of Legitimate Objects; U.S. Appl. No. 13/940,106, filed Jul. 11, 2013.

Dark Reading, "Automated Malware Analysis Under Attack", http://www.darkreading.com/advanced-threats/automated-malware-analysis-under-attack/240145167, as accessed May 14, 2014, (Dec. 20, 2012).

"Gartner Magic Quadrant for Endpoint Protection Platforms", http://www.mcafee.com/us/independent-reports/gartner-mq-endpoint-protection-platforms.aspx, as accessed May 14, 2014, McAfee, Inc., (May 6, 2013).

"Next Generation Detection—Dynamic Malware Analysis Service", http://www.proofpoint.com/products/targeted-attack-protection/next-generation-detection.php, as accessed May 14, 2014, Proofpoint, Inc., (On or before May 14, 2014).

* cited by examiner

SYSTEMS AND METHODS FOR ANALYZING SUSPECTED MALWARE

BACKGROUND

As anti-malware systems have become more effective at recognizing large-scale attacks in the form of viruses or worms that infect many computers, many malware developers have turned instead to developing smaller-scale targeted attacks. A targeted attack may masquerade as a custom program created for a small group or even one single user. As a new piece of software enters an organizational ecosystem, security systems may be at a loss for what action to take. Blocking execution of a program that lacks an established reputation may prevent a user from performing important tasks while the safety of the new program is assessed.

The essential question facing an anti-malware system upon encountering a program without an established reputation is, "What does this program do?" Is it a benign and useful program, or does it pose a threat to the organization? Some clues can be obtained through static analysis of the executable code, but ultimately the question may be answered best by executing the program. Unfortunately, targeted malware typically hides behind the façade of a benign program, only unleashing its malicious functions when a specific set of resources are available to assist the malware code in its attack. Configuring a test environment that includes all or many of the resources a suspected malware program may require before initiating its attack may be time-consuming and prohibitively expensive. Accordingly, the instant disclosure identifies and addresses a need for additional and improved systems and methods for analyzing suspected malware.

SUMMARY

As will be described in greater detail below, the instant disclosure describes various systems and methods for analyzing suspected malware by combining the results of static analysis of a suspected malware sample with telemetry data collected from one or more additional computing devices to construct an execution environment suitable for testing the suspected malware. The execution environment constructed using the systems and methods described herein may provide resources the suspected malware sample was designed to utilize as part of a targeted attack. In this way, the systems and methods described herein may increase the likelihood that malicious behavior of a suspected malware sample will be observed so that appropriate countermeasures may be devised.

In one example, a computer-implemented method for analyzing suspected malware may include (1) identifying a file suspected of including malware, (2) performing a static analysis of the file to identify at least one indication of an attack vector that the file uses to attack computing systems, (3) obtaining, from at least one computing system, telemetry data that identifies at least one indication of an attack vector that the file uses to attack computing systems, (4) constructing, using the indications obtained from the static analysis and the telemetry data, an execution profile that describes an execution environment that provides the attack vectors indicated by the static analysis and the telemetry data, and (5) configuring the execution environment described in the execution profile to test the file for maliciousness.

In some examples, configuring the execution environment described in the execution profile may include (1) configuring one or more virtual computing systems, (2) configuring one or more physical computing systems, (3) installing one or more software programs, (4) configuring one or more system services, (5) configuring one or more database services, and/or (6) configuring directory services data. In one embodiment, the computer-implemented method may further include (1) executing the file within the execution environment, (2) observing behavior of the executing file, (3) determining, based on the observed behavior, that the file includes malware, and (4) performing a security action in response to determining that the file includes malware.

In one embodiment, the security action may include (1) displaying a warning message on the computing system that the computing system is under attack by a file that includes malware, (2) notifying an administrator that the computing system is under attack by a file that includes malware, (3) submitting the file to an anti-malware system, (4) using information that identifies the file, storing results of the static analysis in a telemetry database that associates file-identification information with telemetry data, (5) using information that identifies the file, storing the execution profile in the telemetry database, and/or (6) using information that identifies the file, storing the behavior observed when the file was executed in the telemetry database.

In some examples, identifying the file suspected of including malware may include (1) detecting an unauthorized attempt to create the file, (2) detecting an unauthorized attempt to modify an existing file, (3) detecting an unauthorized attempt to modify a system configuration database, (4) detecting an unexpected attempt to access a network location, (5) detecting an unexpected attempt to execute a software program, (6) detecting an unauthorized attempt to access sensitive data, (7) detecting that the file includes at least one encrypted string, (8) detecting that the file attempts to exploit a known system vulnerability, and/or (9) detecting that the contents of the file are not consistent with the file type. In one embodiment, the indication of the attack vector may include (1) a name of a function library, (2) a name of a database, (3) a file name, (4) a system configuration database key, (5) a uniform resource identifier, (6) a name of a system service, and/or (7) a name of a software program.

In some examples, obtaining the telemetry data may include (1) querying, using information that identifies the file, a telemetry database that associates file information with telemetry data that includes execution information for the file collected from at least one additional computing system that was targeted by the file and (2) receiving, in response to querying the telemetry database, telemetry data for the file. In one embodiment, the telemetry data may include (1) system configuration information from at least one computing system targeted by the file, (2) behavior observed when the file was previously executed, (3) results of at least one previous static analysis, and/or (4) at least one previously constructed execution profile.

In one embodiment, a system for implementing the above-described method may include several modules stored in memory, such as (1) an identification module that identifies a file suspected of including malware, (2) an analysis module that performs a static analysis of the file to identify at least one indication of an attack vector that the file uses to attack computing systems, (3) a telemetry module that obtains, from at least one computing system, telemetry data that identifies at least one indication of an attack vector that the file uses to attack computing systems, (4) a profiling module that constructs, using the indications obtained from the static analysis and the telemetry data, an execution profile that describes an execution environment that provides the attack vectors indicated by the static analysis and the telemetry data, and (5) a configuration module that configures the execution environment described in the execution profile to test the file for maliciousness. The system may also include at least one physical processor configured to execute the identification module, the analysis module, the telemetry module, the profiling module, and the configuration module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file suspected of including malware, (2) perform a static analysis of the file to identify at least one indication of an attack vector that the file uses to attack computing systems, (3) obtain, from at least one computing system, telemetry data that identifies at least one indication of an attack vector that the file uses to attack computing systems, (4) construct, using the indications obtained from the static analysis and the telemetry data, an execution profile that describes an execution environment that provides the attack vectors indicated by the static analysis and the telemetry data, and (5) configure the execution environment described in the execution profile to test the file for maliciousness.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
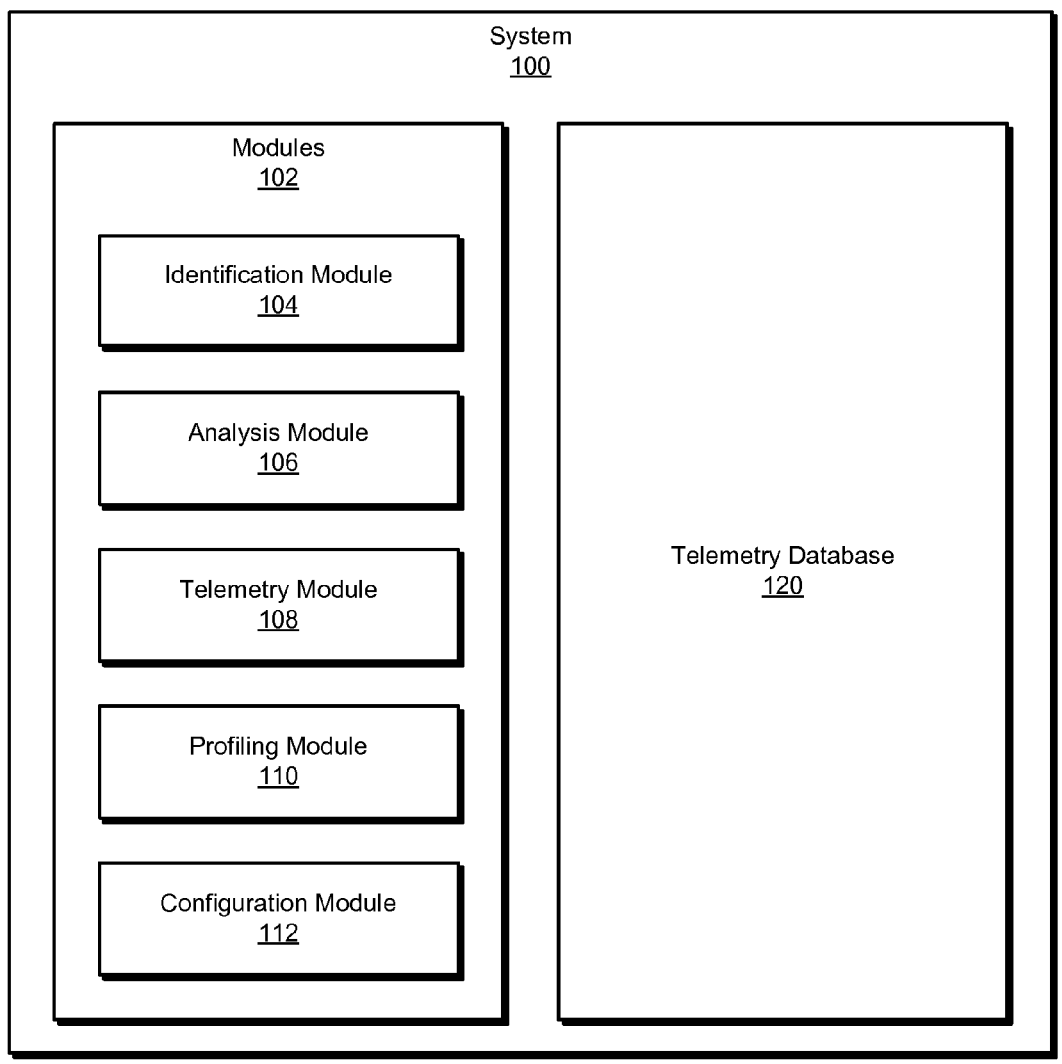
FIG. 1 is a block diagram of an exemplary system for analyzing suspected malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for analyzing suspected malware. As will be explained in greater detail below, the systems and methods described herein may elicit malicious behavior from a suspected malware file by using both static analysis and telemetry data to help create an execution environment with the resources the suspected malware file may require before triggering the malicious functions for which the malware was designed. In this way, the systems and methods described herein may identify malware threats sooner and with a lesser commitment of resources.

Figure 2:
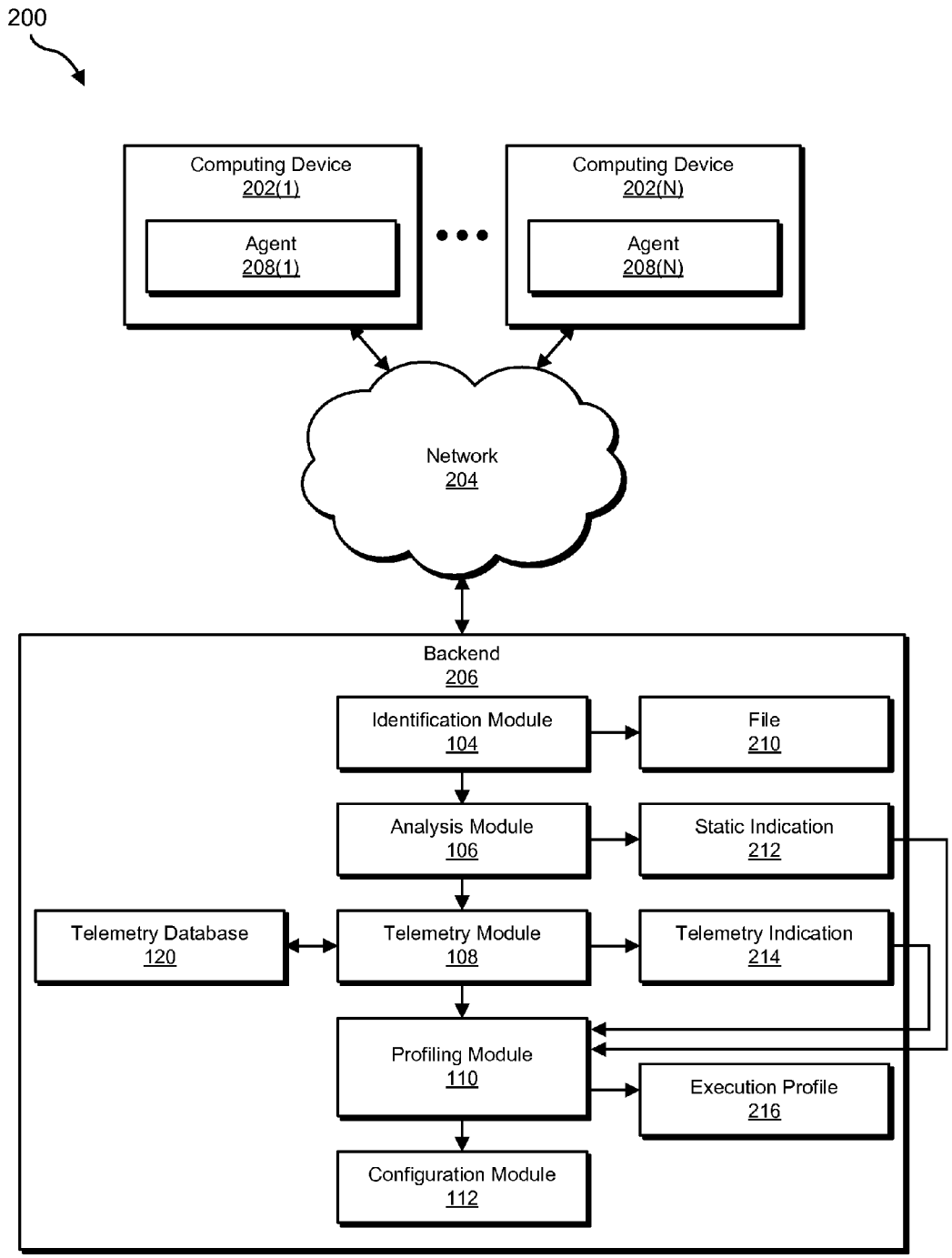
FIG. 2 is a block diagram of an additional exemplary system for analyzing suspected malware.
Figure 3:
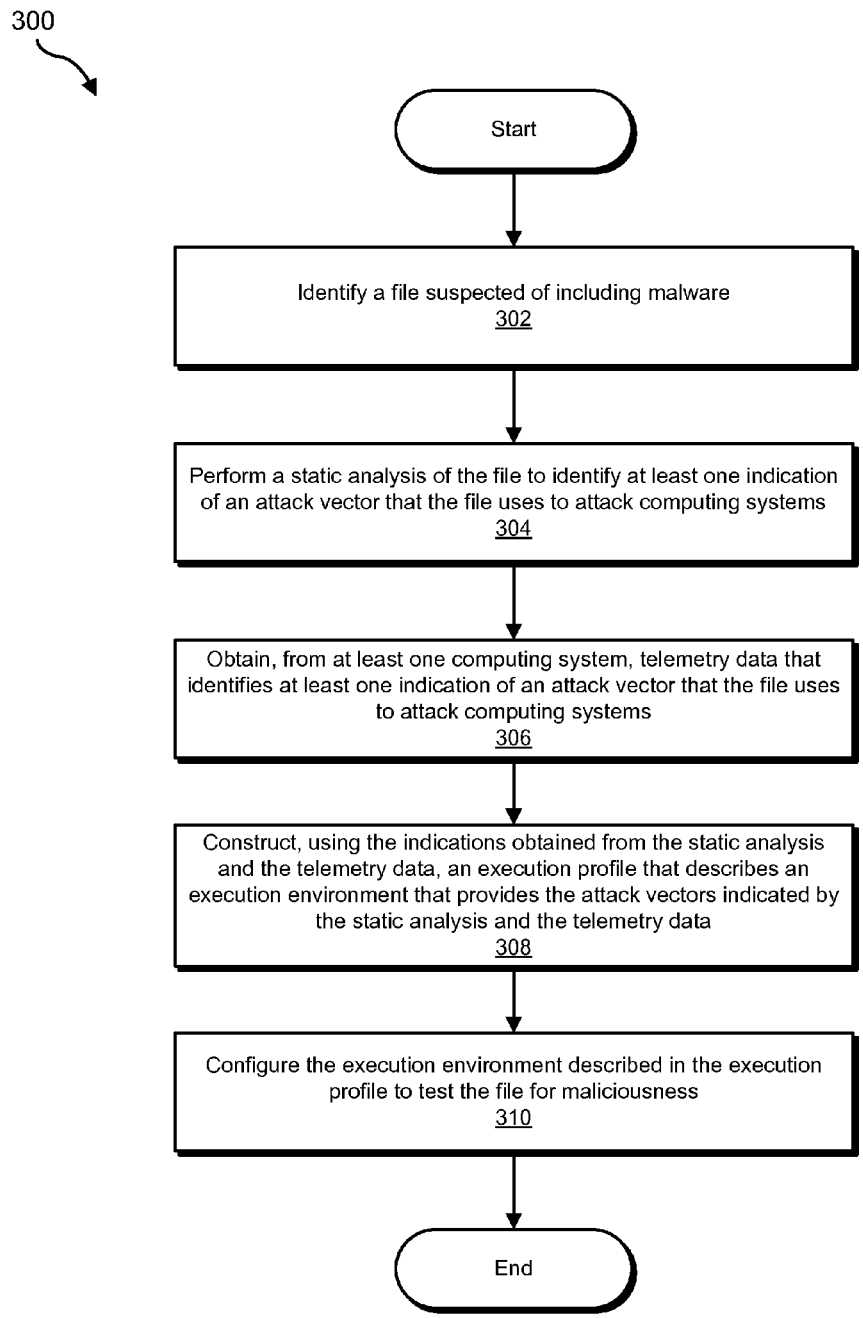
FIG. 3 is a flow diagram of an exemplary method for analyzing suspected malware.
Figure 4:
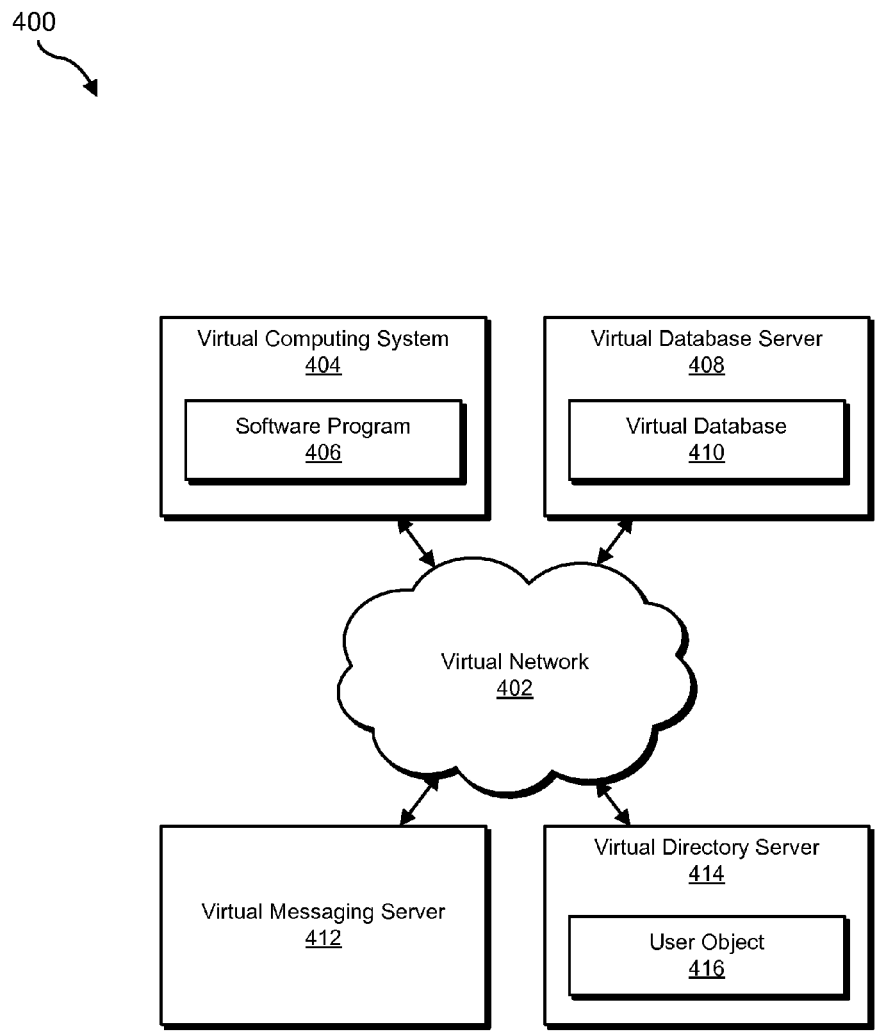
FIG. 4 is a block diagram of an exemplary execution environment for a suspected malware file.

The following will provide, with reference to FIGS. 1, 2, and 4, detailed descriptions of exemplary systems for analyzing suspected malware. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for analyzing suspected malware. As illustrated in this figure, exemplary system 100 may include one or more modules 102 for performing one or more tasks. For example, and as will be explained in greater detail below, exemplary system 100 may also include an identification module 104 that may identify a file suspected of including malware. Exemplary system 100 may additionally include an analysis module 106 that may perform a static analysis of the file to identify at least one indication of an attack vector that the file uses to attack computing systems. Exemplary system 100 may also include a telemetry module 108 that may obtain, from at least one computing system, telemetry data that identifies at least one indication of an attack vector that the file uses to attack computing systems. Exemplary system 100 may additionally include a profiling module 110 that may construct, using the indications obtained from the static analysis and the telemetry data, an execution profile that describes an execution environment that provides the attack vectors indicated by the static analysis and the telemetry data. Exemplary system 100 may also include a configuration module 112 that may configure the execution environment described in the execution profile to test the file for maliciousness. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or backend 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as telemetry database 120. In one example, telemetry database 120 may be configured to store system configuration information from one or more computing systems targeted by malware attacks, behavioral observations of previously detected malware, the results of previous static analysis of malware, and/or execution profiles describing execution environments suitable for testing suspected malware files.

Telemetry database 120 may represent portions of a single database or computing device or a plurality of databases or computing devices. For example, telemetry database 120 may represent a portion of backend 206 in FIG. 2, computing system 510 in FIG. 5, and/or portions of exemplary network architecture 600 in FIG. 6. Alternatively, telemetry database 120 in FIG. 1 may represent one or more physically separate devices capable of being accessed by a computing device, such as backend 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of computing devices 202(1)-(N) in communication with a backend 206 via a network 204. In one example, computing devices 202(1)-(N) may be programmed with one or more of modules 102 and/or may store all or a portion of the data in telemetry database 120. Additionally or alternatively, backend 206 may be programmed with one or more of modules 102 and/or may store all or a portion of the data in telemetry database 120.

In one embodiment, one or more of modules 102 from FIG. 1 may, when executed by at least one processor of computing devices 202(1)-(N) and/or backend 206, enable computing devices 202(1)-(N) and/or backend 206 to analyze suspected malware. For example, and as will be described in greater detail below, identification module 104 may identify a file 210 suspected of including malware. Analysis module 106 may then perform a static analysis of file 210 to identify at least one static indication 212 of an attack vector that file 210 uses to attack computing systems. Telemetry module 108 may then query telemetry database 120 to obtain telemetry data that identifies at least one telemetry indication 214 of an attack vector that file 210 uses to attack computing systems. Profiling module 110 may then construct, using the indications 212 and 214 obtained from the static analysis and the telemetry data, an execution profile 216 that describes an execution environment that provides the attack vectors indicated by the static analysis and the telemetry data. Finally, configuration module 112 may configure the execution environment described in execution profile 216 to test file 210 for maliciousness.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Backend 206 generally represents any type or form of computing device that is capable of storing, comparing, and/or providing data. Examples of backend 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing devices 202(1)-(N) and backend 206.

FIG. 3 is a flow diagram of an exemplary computer-implemented method 300 for analyzing suspected malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a file suspected of including malware. For example, identification module 104 may, as part of computing device 202 in FIG. 2, identify a file 210 suspected of including malware.

Identification module 104 may identify suspected malware files in a variety of ways and at a number of points within an organizational infrastructure. For example, identification module 104 may receive a suspected malware file from an anti-malware program running on a computing device (represented as agents 208(1)-(N) on computing devices 202(1)-(N) in FIG. 2). The malware file may have been copied to the computing device from a removable storage device or over a local network from another computing device, for example.

In another example, identification module 104 may receive a suspected malware file that was intercepted by a gateway or other network device as the file entered the organizational network from the Internet or other public network. In another example, identification module 104 may receive a suspected malware file from a server that is in communication with the Internet, such as a messaging server, web server, or database server.

Identification module 104 may identify the file as suspected malware in a variety of ways. In some examples, identification module 104 may identify the file suspected of including malware by detecting unauthorized file system access, such as an unauthorized attempt to create a file or an unauthorized attempt to modify an existing file. For example, a malware program may attempt to copy itself or a malware payload from one computing device to another. In another example, identification module 104 may identify a file as suspected malware by detecting an unauthorized attempt to modify a system configuration database, such as the registry on a system running MICROSOFT WINDOWS.

In other examples, identification module 104 may identify a file as suspected malware by detecting an unexpected attempt to access a network location, particularly if the network location has a reputation of being associated with malware. Identification module 104 may also identify a file as suspected malware by detecting that a program has made an unexpected attempt to execute another software program, or made an unauthorized attempt to access sensitive data. In other examples, identification module 104 may identify a file as suspected malware by identifying attempts to obfuscate the purpose of executable code contained in the file. For example, identification module 104 may detect that the file includes encrypted strings that may hide network locations the malware may access, or that the contents of the file are not consistent with the file type. Identification module 104 may also identify a file as suspected malware by detecting that the file contains executable code that attempts to exploit a known system vulnerability.

At step 304, one or more of the systems described herein may perform a static analysis of the file to identify at least one indication of an attack vector that the file uses to attack computing systems. For example, analysis module 106 may, as part of computing device 202 in FIG. 2, perform a static analysis of file 210 to identify at least one static indication 212 of an attack vector that file 210 uses to attack computing systems.

The term "attack vector," as used herein, generally refers to a resource or vulnerability that malware exploits or uses as part of an attack. Examples of attack vectors include, without limitation, communication protocols, such as hypertext transfer protocol (HTTP), simple mail transfer protocol (SMTP), file transfer protocol (FTP), or internet relay chat (IRC), file storage or networking infrastructure, databases, directory services, authentication services, executable code, etc.

Analysis module 106 may take several approaches and/or use a number of tools, alone or in combination, in performing a static analysis of a file. For example, analysis module 106 may simply examine the contents of a file to identify strings, such as uniform resource identifiers (URIs), database connection strings, server names, registry keys, program names, etc. Analysis module 106 may also analyze executable code in the file to attempt to determine malicious functions the code may perform when executed. To assist with the code analysis, analysis module 106 may employ a variety of code analysis tools, such as disassemblers or decompilers. Analysis module 106 may also use decryption tools to decrypt encrypted code segments.

Analysis module 106 may identify indications of attack vectors that take a variety of forms. In some examples, indications of attack vectors may include (1) a name of a function library, (2) a name of a database, (3) a file name, (4) a system configuration database key, (5) a uniform resource identifier, (6) a name of a system service, and/or (7) a name of a software program. Analysis module 106 may also identify any resource a malware file may utilize as part of a targeted attack as an indication of an attack vector. For example, a user name in a malware file may indicate that the malware file is designed to make use of a user account as part of a targeted attack.

At step 306, one or more of the systems described herein may obtain, from at least one computing system, telemetry data that identifies at least one indication of an attack vector that the file uses to attack computing systems. For example, telemetry module 108 may, as part of computing device 202 in FIG. 2, obtain telemetry data that identifies at least one telemetry indication 214 of an attack vector that file 210 uses to attack computing systems. In one example, this telemetry data may be received from computing devices 202(1)-(N) and compiled in telemetry database 120.

The term "telemetry data," as used herein, generally refers to data collected from endpoint computing devices that may have previously encountered a suspected malware file. Examples of telemetry data include, without limitation, (1) system configuration information from one or more computing systems targeted by the file, (2) behavior observed when the file was previously executed, (3) the results of previous static analysis, and/or (4) previously constructed execution profiles.

Telemetry module 108 may obtain telemetry data in a variety of ways. In one example, telemetry data may be divided between a telemetry database that houses data compiled from endpoint computing devices, and a malware database that contains the results of static analysis, behavioral observations, and/or execution profiles. In some examples, telemetry module 108 may obtain the telemetry data by (1) querying, using information that identifies the file, a telemetry database that associates file information with telemetry data that includes execution information for the file collected from one or more additional computing systems that were targeted by the file and (2) receiving, in response to querying the telemetry database, telemetry data for the file.

At step 308, one or more of the systems described herein may construct, using the indications obtained from the static analysis and the telemetry data, an execution profile that describes an execution environment that provides the attack vectors indicated by the static analysis and the telemetry data. For example, profiling module 110 may, as part of computing device 202 in FIG. 2, construct, using the indications 212 and 214 obtained from the static analysis and the telemetry data, execution profile 216 that describes an execution environment that provides the attack vectors indicated by the static analysis and the telemetry data.

The term "execution environment," as used herein, generally refers to a configuration of virtual and/or physical computing devices, suitable for executing the suspected malware file, and including resources identified via static analysis and/or telemetry data as likely attack vectors for the suspected malware file. Profiling module 110 may construct an execution profile in a variety of ways. For example, profiling module 110 may use the results of a static analysis that determined that a particular suspected malware file may utilize a specific user account in an ACTIVE DIRECTORY database, and an application server with a specific application installed. In this example, profiling module 110 may combine these static analysis results with telemetry data for the suspected malware file that may indicate, for example, that the suspected malware sample may be targeting a computing device running MICROSOFT WINDOWS VISTA where the user account has administrative access. As such, profiling module 110 may construct an execution profile that includes all the components of this execution environment, including a virtual computing device running MICROSOFT WINDOWS VISTA, an ACTIVE DIRECTORY server with the identified user account, and the user account granted administrative access to the virtual computing device.

In another example, analysis module 106 may determine that a suspected malware file includes strings containing filename extensions for MICROSOFT ACCESS database files and the names of several utility programs. Telemetry module 108 may additionally determine from data collected from other endpoints that the suspected malware file uses one or more of the utility programs to create a compacted and encrypted archive file, which the malware file attempts to transmit either as an email attachment or using the file transport protocol utility, FTP.EXE. Profiling module 110 may then construct an execution profile that includes a virtual computing device with MICROSOFT ACCESS installed, along with the identified utility programs and FTP.EXE, a MICROSOFT ACCESS database file populated with test data, and a messaging server with an email account configured for access by a user account on the virtual computing device. A more extensive example of an execution environment is provided below, in the description of FIG. 4.

At step 310, one or more of the systems described herein may configure the execution environment described in the execution profile to test the file for maliciousness. For example, configuration module 112 may, as part of computing device 202 in FIG. 2, configure the execution environment described in execution profile 216 to test file 210 for maliciousness.

Configuration module 112 may configure the execution environment in any suitable manner. For example, configuration module 112 may configure the execution environment described in the execution profile by configuring one or more virtual computing systems. By using virtual machines, the systems and methods described herein may quickly configure an execution environment that provides the suspected malware file with the resources it may be most likely to utilize in a targeted attack. In some instances, configuration module 112 may also include one or more physical computing systems in an execution environment. For example, configuration module 112 may use physical computing systems to advantage to provide parts of a complex execution environment that remain stable during the testing of several suspected malware files.

In addition to the computing systems included in the execution environment, configuration module 112 may, in some examples, provide additional resources that the suspected malware file may utilize as part of a targeted attack. For example, configuration module 112 may install software programs, configure system services (such as messaging services, directory services, or web servers), and/or configure one or more database services. Configuration module 112 may also create one or more databases that may be targeted or otherwise utilized by the suspected malware file and then populate these databases with test data. Likewise, configuration module 112 may also configure directory services objects that may be utilized by the suspected malware file. For example, configuration module 112 may create a structure of organizational units, users, and groups that matches the organization ostensibly under attack.

In one embodiment, the systems described herein may (1) execute the suspected malware file within the execution environment, (2) observe behavior of the executing file, (3) determine, based on the observed behavior, whether the file includes malware, and (4) in response to determining that the file includes malware, perform a security action.

FIG. 4 is a block diagram of an exemplary execution environment 400 for a suspected malware file that may be configured by configuration module 112 using an execution profile created by profiling module 110 for the suspected malware file. As depicted in FIG. 4, execution environment 400 may include a virtual computing system 404 with software program 406 installed, virtual database server 408 hosting virtual database 410, virtual messaging server 412, and virtual directory server 414 that includes user object 416. In this example, the virtual machines included in execution environment 400 may communicate through virtual network 402. In addition, configuration module 112 may execute the suspected malware file for which configuration module 112 configured execution environment 400 on any of the virtual machines, and monitor the behavior of the suspected malware file to determine whether the file does, in fact, engage in malicious behavior.

If configuration module 112 determines the suspected malware file is malicious, the systems and methods described herein may initiate one or more security actions. Examples of such security actions may include, without limitation, (1) displaying a warning message on the computing system that the computing system is under attack by a file that includes malware, (2) notifying an administrator that the computing system is under attack (3) submitting the file to an anti-malware system, (4) storing the results of the static analysis in a telemetry database, (5) storing the execution profile in the telemetry database, and/or (6) storing the behavior observed when the file was executed in the telemetry database. In one embodiment, configuration module 112 may store in an anti-malware system database the results of the static analysis, the execution profile, and behavior observed when the file was executed.

As described above, the systems and methods described herein may analyze a suspected malware file by conducting a static analysis of the file and combining the results of the static analysis with telemetry data to identify likely attack vectors that the suspected malware file may use as part of a targeted attack. The systems and methods described herein may then compile an execution profile that includes system resources that include the identified attack vectors. Additionally, the systems and methods described herein may configure an execution environment according to the execution profile, so that the suspected malware file may be executed and its behavior observed. If the suspected malware file is determined to be malicious, data collected and compiled during the analysis may be stored in a telemetry or anti-malware system database for later reference.

By doing so, the systems and methods described herein may quickly configure an execution environment that is likely to elicit malicious behavior from suspected malware files. In addition, the use of virtual machines may facilitate obtaining timely determination of a suspected malware file's behavior without an extensive commitment of physical resources or significant administrator involvement in the testing process.

Figure 5:
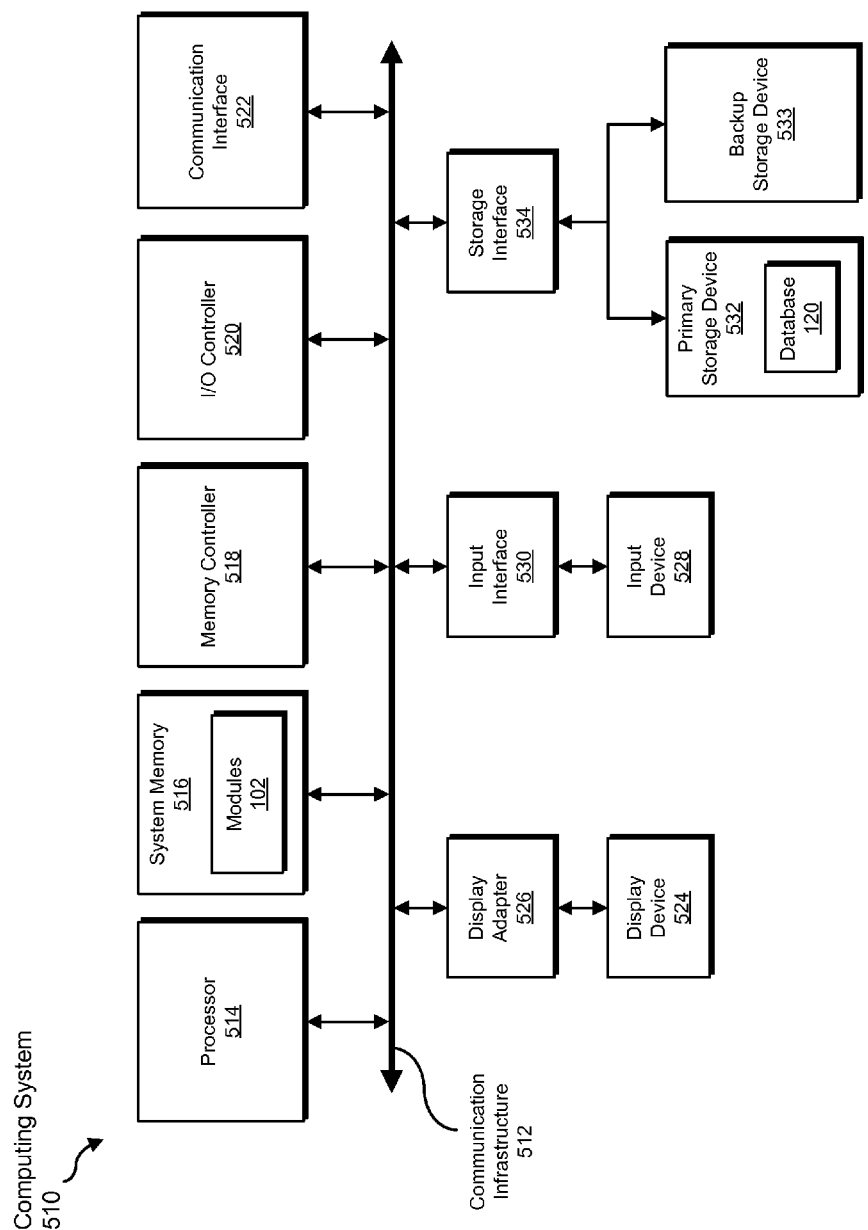
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, telemetry database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
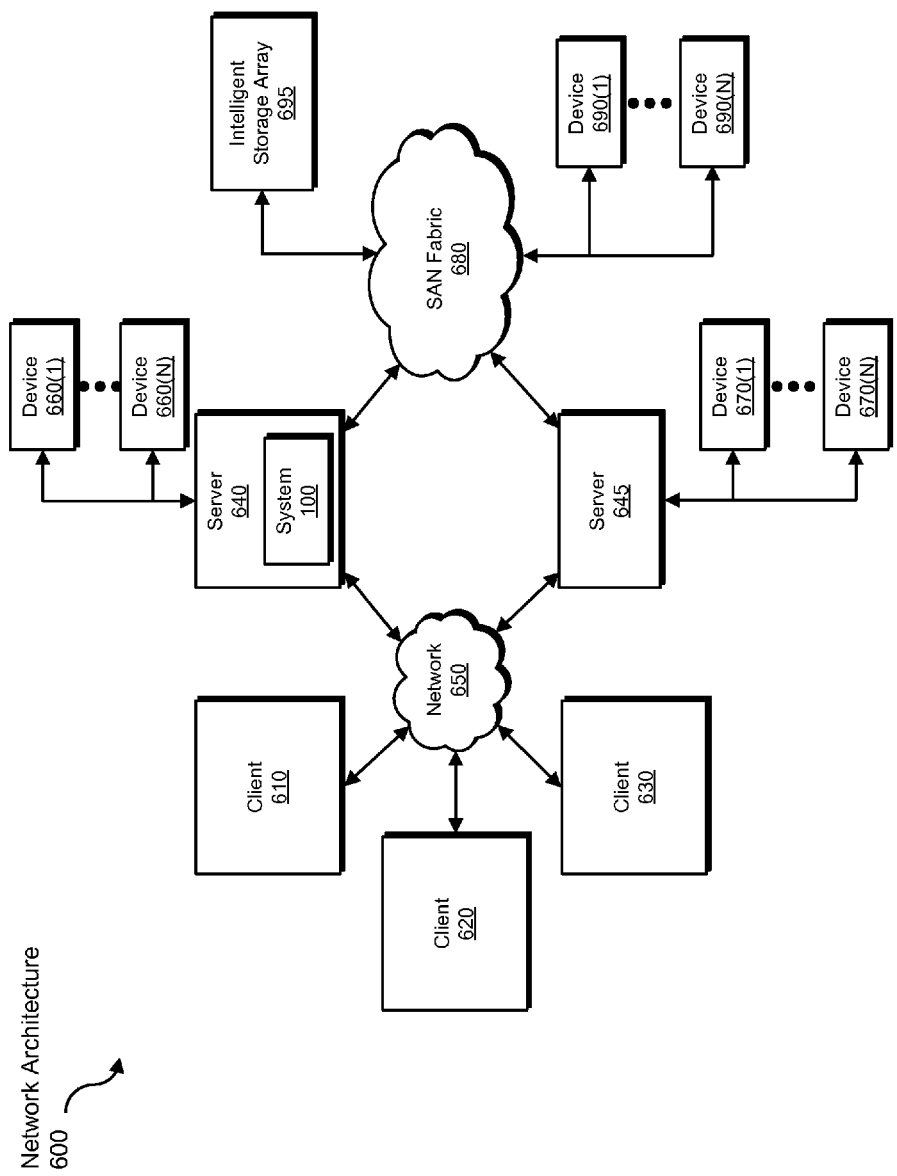
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for analyzing suspected malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, use the result of the transformation to construct an execution profile that describes an execution environment that may be used to analyze suspected malware, and store the result of the transformation to facilitate subsequent analysis. Modules described herein may also transform a physical computing system into a system for analyzing suspected malware. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for analyzing suspected malware, at least a portion of the method being performed by a computing device comprising at least one processor, the method comprising:
   identifying a file suspected of including malware;
   determining that the file is configured to perform an attack on an external computing system that belongs to the same network as a computing system on which the file is configured to execute by:
      performing a static analysis of the file to identify at least one indication that the file is configured to perform an attack on the external computing system; and
      obtaining, from at least one additional computing system that was previously targeted by the file, telemetry data that identifies at least one indication that the file previously attempted to attack an additional external computing system that belonged to the same network as the additional computing system, wherein obtaining the telemetry data comprises:
      querying, using information that identifies the file, a telemetry database that associates file information with telemetry data, the telemetry database comprising information for the file collected from the additional computing system that was previously targeted by the file; and
      receiving, in response to querying the telemetry database, telemetry data for the file;
   constructing, using the indications obtained from the static analysis and the telemetry data, an execution profile that describes an execution environment that provides a virtual instance of the external computing system; and
   configuring the execution environment described in the execution profile to test the file for maliciousness.

2. The computer-implemented method of claim 1, wherein
   configuring the execution environment described in the execution profile comprises at least one of:
   configuring at least one virtual computing system;
   configuring at least one physical computing system;
   installing at least one software program;
   configuring at least one system service;
   configuring at least one database service; and
   configuring directory services data.

3. The computer-implemented method of claim 1, further comprising:
   executing the file within the execution environment;
   observing behavior of the executing file;
   determining, based on the observed behavior, that the file includes malware; and
   performing a security action in response to determining that the file includes malware.

4. The computer-implemented method of claim 3, wherein the security action comprises at least one of:
   displaying a warning message on the external computing system that the external computing system is under attack by a file that includes malware;
   notifying an administrator that the external computing system is under attack by a file that includes malware;
   submitting the file to an anti-malware system;
   using information that identifies the file, storing results of the static analysis in the telemetry database;
   using information that identifies the file, storing the execution profile in the telemetry database; and
   using information that identifies the file, storing the behavior observed when the file was executed in the telemetry database.

5. The computer-implemented method of claim 1, wherein
   identifying the file suspected of including malware comprises at least one of:
   detecting an unauthorized attempt to create the file;
   detecting an unauthorized attempt to modify an existing file;
   detecting an unauthorized attempt to modify a system configuration database;
   detecting an unexpected attempt to access a network location; and
   detecting an unexpected attempt to execute a software program.

6. The computer-implemented method of claim 1, wherein the indication obtained from the static analysis comprises at least one of:
   a name of a function library;
   a name of a database;
   a file name;
   a system configuration database key;
   a uniform resource identifier;
   a name of a system service; and
   a name of a software program.

7. The computer-implemented method of claim 1, wherein identifying the file suspected of including malware comprises at least one of:
   detecting that the file includes at least one encrypted string;
   detecting that the file attempts to exploit a known system vulnerability; and
   detecting that the contents of the file are not consistent with the file type.

8. The computer-implemented method of claim 1, wherein the telemetry data comprises at least one of:
   system configuration information from the additional computing system that was previously targeted by the file;
   behavior observed when the file was previously executed;
   results of at least one previous static analysis; and
   at least one previously constructed execution profile.

9. A system for analyzing suspected malware, the system comprising:
a memory;
an identification module, stored in the memory, that identifies a file suspected of including malware;
an analysis module, stored in the memory, that determines that the file is configured to perform an attack on an external computing system that belongs to the same network as a computing system on which the file is configured to execute by:
performing a static analysis of the file to identify at least one indication that the file is configured to perform an attack on the external computing system; and
obtaining, from at least one additional computing system that was previously targeted by the file, telemetry data that identifies at least one indication that the file previously attempted to attack an additional external computing system that belonged to the same network as the additional computing system, wherein obtaining the telemetry data comprises:
querying, using information that identifies the file, a telemetry database that associates file information with telemetry data, the telemetry database comprising information for the file collected from the additional computing system that was previously targeted by the file; and
receiving, in response to querying the telemetry database, telemetry data for the file;
a profiling module, stored in the memory, that constructs, using the indications obtained from the static analysis and the telemetry data, an execution profile that describes an execution environment that provides a virtual instance of the external computing system;
a configuration module, stored in the memory, that configures the execution environment described in the execution profile to test the file for maliciousness; and
at least one physical processor configured to execute the identification module, the analysis module, the profiling module, and the configuration module.

10. The system of claim 9, wherein the configuration module configures the execution environment described in the execution profile by at least one of:
configuring at least one virtual computing system;
configuring at least one physical computing system;
installing at least one software program;
configuring at least one system service;
configuring at least one database service; and
configuring directory services data.

11. The system of claim 9, further comprising:
an execution module, stored in the memory, that executes the file within the execution environment;
an observation module, stored in the memory, that observes behavior of the executing file;
an evaluation module, stored in the memory, that determines, based on the observed behavior, that the file includes malware; and
a security module, stored in the memory, that performs a security action in response to determining that the file includes malware.

12. The system of claim 11, wherein the security action performed by the security module comprises at least one of:
displaying a warning message on the external computing system that the external computing system is under attack by a file that includes malware;
notifying an administrator that the external computing system is under attack by a file that includes malware;
submitting the file to an anti-malware system;
using information that identifies the file, storing results of the static analysis in the telemetry database;
using information that identifies the file, storing the execution profile in the telemetry database; and
using information that identifies the file, storing the behavior observed when the file was executed in the telemetry database.

13. The system of claim 9, wherein the identification module identifies the file suspected of including malware by at least one of:
detecting an unauthorized attempt to create the file;
detecting an unauthorized attempt to modify an existing file;
detecting an unauthorized attempt to modify a system configuration database;
detecting an unexpected attempt to access a network location;
detecting an unexpected attempt to execute a software program; and
detecting an unauthorized attempt to access sensitive data.

14. The system of claim 9, wherein the indication obtained from the static analysis comprises at least one of:
a name of a function library;
a name of a database;
a file name;
a system configuration database key;
a uniform resource identifier;
a name of a system service; and
a name of a software program.

15. The system of claim 9, wherein the identification module identifies the file suspected of including malware by at least one of:
detecting that the file includes at least one encrypted string;
detecting that the file attempts to exploit a known system vulnerability; and
detecting that the contents of the file are not consistent with the file type.

16. The system of claim 9, wherein the telemetry data comprises at least one of:
system configuration information from the additional computing system that was previously targeted by the file;
behavior observed when the file was previously executed;
results of at least one previous static analysis; and
at least one previously constructed execution profile.

17. A non-transitory computer-readable medium comprising one or more computer-readable instructions that, when executed by at least one processor of a computing device, cause the computing device to:
identify a file suspected of including malware;
determine that the file is configured to perform an attack on an external computing system that belongs to the same network as a computing system on which the file is configured to execute by:
performing a static analysis of the file to identify at least one indication that the file is configured to perform an attack on the external computing system; and
obtaining, from at least one additional computing system that was previously targeted by the file, telemetry data that identifies that the file previously attempted to attack an additional external computing system that belonged to the same network as the additional computing system, wherein obtaining the telemetry data comprises:

querying, using information that identifies the file, a telemetry database that associates file information with telemetry data, the telemetry database comprising information for the file collected from the additional computing system that was previously targeted by the file; and receiving, in response to querying the telemetry database, telemetry data for the file;

construct, using the indications obtained from the static analysis and the telemetry data, an execution profile that describes an execution environment that provides a virtual instance of the external computing system; and configure the execution environment described in the execution profile to test the file for maliciousness.

18. The non-transitory computer-readable medium of claim 17, wherein the one or more computer-readable instructions cause the computing device to configure the execution environment described in the execution profile by at least one of:

configuring at least one virtual computing system;
configuring at least one physical computing system;
installing at least one software program;
configuring at least one system service;
configuring at least one database service; and
configuring directory services data.

19. The non-transitory computer-readable medium of claim 17, wherein the one or more computer-readable instructions further cause the computing device to:

execute the file within the execution environment;
observe behavior of the executing file;
determine, based on the observed behavior, that the file includes malware; and
perform a security action in response to determining that the file includes malware.

20. The non-transitory computer-readable medium of claim 19, wherein the security action comprises at least one of:

displaying a warning message on the external computing system that the external computing system is under attack by a file that includes malware;
notifying an administrator that the external computing system is under attack by a file that includes malware;
submitting the file to an anti-malware system;
using information that identifies the file, storing results of the static analysis in the telemetry database;
using information that identifies the file, storing the execution profile in the telemetry database; and
using information that identifies the file, storing the behavior observed when the file was executed in the telemetry database.

* * * * *